United States Patent [19]

Boucher et al.

[11] Patent Number: 5,676,360
[45] Date of Patent: Oct. 14, 1997

[54] MACHINE TOOL ROTARY TABLE LOCKING APPARATUS

[76] Inventors: John N. Boucher, 110 Coveridge La., Longwood, Fla. 32779; David E. Bajune, 6800 W. S.R. 46, Sanford, Fla. 32773

[21] Appl. No.: 500,733

[22] Filed: Jul. 11, 1995

[51] Int. Cl.$^6$ ..................................... B23Q 1/25
[52] U.S. Cl. ............................... 269/74; 269/57
[58] Field of Search ..................... 451/397, 398; 134/153, 157, 902, 25.4; 269/20, 57, 56, 73, 71; 188/368, 366, 71.4, 73.2; 74/826, 813

[56] References Cited

U.S. PATENT DOCUMENTS

| | | | |
|---|---|---|---|
| 1,804,185 | 5/1931 | Skopik | 188/366 |
| 1,908,259 | 5/1933 | Knowles | 451/398 |
| 3,647,043 | 3/1972 | Garetto | 269/57 |
| 3,786,721 | 1/1974 | Reda . | |
| 3,841,453 | 10/1974 | Culbertson | 192/109 |
| 4,188,719 | 2/1980 | Hoff | 30/122 |
| 4,688,974 | 8/1987 | Wright et al. | 409/219 |
| 4,838,979 | 6/1989 | Nishida et al. | 134/902 |
| 5,322,079 | 6/1994 | Fukutomi et al. . | |

FOREIGN PATENT DOCUMENTS

| | | | |
|---|---|---|---|
| 3838019 | 11/1987 | Germany . | |
| 4723514 | 7/1967 | Japan . | |
| 5285757 | 11/1993 | Japan . | |
| 406023635 | 2/1994 | Japan | 269/57 |
| 0608636 | 5/1978 | U.S.S.R. . | |
| 1301652 | 4/1987 | U.S.S.R. | 269/57 |
| 9014521 | 11/1990 | WIPO . | |

*Primary Examiner*—Timothy V. Eley
*Assistant Examiner*—Lee Wilson
*Attorney, Agent, or Firm*—Allen, Dyer, Doppelt, Milbrath & Gilchrist, P.A.

[57] ABSTRACT

A rotary table lockdown apparatus made a part of a computer controlled dicing saw holds a table work surface parallel to a reference surface independent of axial misalignment and without rotational movement. The apparatus includes a deflectable disk rotor radially extended from the table within a plane parallel to the reference surface. A piston styled plunger is biased against a top surface of the rotor forcing it into frictional contact with the reference surface for holding the table and thus the work surface in a rigid position for operation on a workpiece removably attached to the work surface. A chamber is pressurized to displace the plunger in a piston-like manner against a top surface of the rotor. A flexible O-ring holds the plunger in sealable contact with chamber walls and with increased pressure in the chamber flexes to permit the displacement of the plunger. Upon release of the pressure, the flexible O-ring pulls the plunger out of contact with the rotor permitting the table to be rotated. To provide further rigidity, a ball bearing assembly operating within a table rotation shaft and bore permits free rotation of the shaft within the bore under chamber ambient pressure conditions. During chamber increased pressure, displacement of the rotor also results in longitudinal displacement of the shaft forcing the ball bearings to bias against opposing shaft and bore race edges preventing axial misalignment of the shaft and thus table work surface.

17 Claims, 6 Drawing Sheets

MACHINE TOOL ROTARY TABLE LOCKING APPARATUS

BACKGROUND OF INVENTION

1. Field of Invention

The invention relates generally to a clamping apparatus, and more particularly to an apparatus for clamping a rotatable machine tool table during operating of the machine.

2. Background Art

Die separation or dicing by sawing is the process of cutting a microelectronic substrate into its individual circuit dice with a rotating circular abrasive saw blade. This process has proven to be the most efficient and economical method in use today. It provides versatility in selection of depth and width of cut, as well as selection of surface finish, and can be used to saw either partially or completely through a substrate. Wafer dicing technology has progressed rapidly, and dicing is now a mandatory procedure in most front-end semiconductor packaging operations. It is used extensively for separation of die on silicon integrated circuit wafers.

Increasing use of microelectronic technology in microwave and hybrid circuits, memories, computers, and defense and medical electronics has created an array of new and different problems for the industry. More expensive and exotic materials, such as sapphire, garnet, alumina, ceramic, glass, quartz, ferrite, and other hard brittle substrates are being used. They are often combined to produce multiple layers of dissimilar materials, thus adding further to the dicing problems. The high cost of substrates together with the value of the circuits fabricated on them makes it difficult to accept anything less that high yield at the die separation phase.

Dicing semi-conductor wafers by sawing is actually an abrasive machining process similar to grinding and cut-off operations that have been in use for decades. However, the size of the dicing blades used for die separation makes the process unique. Typically the blade thickness ranges from 0.6 mils to 25 mils and diamond particles (the hardest known material) are used as the abrasive material ingredient. Because of the diamond dicing blades extreme fineness, compliance with a strict set of parameters is imperative, and even the slightest deviation from the norm can result in complete failure.

Of particular importance are three critical machine parameters or constraints for dicing diamond grinding technology. Applying these parameters properly is critical to the proper selection of process components. The parameters of rigidity, power, and cooling must be considered for each system component selection. It must also be understood that each component involved in the sawing process cannot create sawing efficiency alone, but rather, all of the components as an interactive system must be comparable in meeting standards. If just one component is in error, it could render all other properly selected components in effective due to its dominance in the sawing process.

This situation often leads the user to employ improper judgment in blade selection or in setting system parameters. The result is an attempt to treat a symptom rather than the cause of the problem which was created by an improperly set system component. This approach can preclude ever achieving a truly economical and efficient sawing system.

The present invention addresses the need for rigidity in wafer dicing machine components and in particular to rigidity of the chuck or work surface upon which the substrate is placed for the dicing process. Whether dicing silicon materials at inch per second feed rates or cutting into heavy cross sections of ceramic based material, system rigidity plays a major role in sawing efficiency. It is most important to note that rigidity not only pertains to the equipment being used, but also to the diamond blade and work piece mounting methods, as well as to operating parameters. Hence we discuss the reason for system rigidity with the machine being but a component of the total system.

The machine base foundation must be designed and constructed of suitable material in order to prevent excessive flexing on the load or transmission of vibration to the integral movements of the machine. A rigidly mounted spindle with virtually no end play or vibration is mandatory for dicing and diamond grinding. Additionally, the perpendicularity of the spindle is essential for the diamond blade to run true. While most end users will take considerable steps in assuring the rigidity of the machine they purchase, they will often overlook the critical mounting requirements necessary for the diamond blade. No matter how well the diamond blade was manufactured to run true, it can only run as accurately as the surfaces in which it comes into contact. The present invention addresses the table surface upon which the wafer is placed and discloses a new and useful apparatus for maintaining that surface in a rigid position during the dicing of the substrate.

International patent application PCT EP 90/WO780 to Gnani discloses a method end device for locking a body which rotates about an axis to a stationary body in which the rotating body bears an integral rotating annular or disk member which is symmetrical with respect to the axis of rotation and in which clamping or gripping locking means is employed such as in caliper brakes. The locking means straddle the annular member in order to tighten against opposing sides of the annular member when activated. The locking means has one elastically flexible friction member integral with the stationary body which is placed between the annular member and the locking means in such a way that when the locking means are activated, they lock the rotating body in relation to the stationary body by means of at least one flexible member pressed against the annular member. In the invention disclosed, neither the rotating body nor the rotating annular member integral therewith is subjected to any controlled deformation in order to be placed in contact with the stationary body or locking means. Gnani '780 recognizes the disadvantages when the relative position of two bodies is altered in order to achieve locking. Further he identified the disadvantage when the rotating body or the annular disk is subjected to elastic deformation through being placed in contact with the stationary body or locking means. The difficulty of achieving a fixed immovable locking device is also identified and although the rotating body and the stationary body are both immobilized, their relative positioning during static locking may be altered, giving rise to uncertainty in the final relative position of the two bodies when locked.

German patent reference DE 3,838,019 A1 to Teramachi discloses a rotary table having a surface that rotates about an axis in line with an integral electric servo motor. The motor is supported on a roller bearing that has the inner race fixed to a central tube. The windings of the motor are built into a stator assembly in the center of the unit. An incremented high resolution rotary encoder system is built into the unit for angular position measurements. An electromagnetic brake allows the table to be retained in a position. The device is promoted for use in semiconductor manufacturing where precision measurements, high speed, high accuracy and rotary positioning are needed, however, the rigidity and tolerances demanded in the dicing industry are not discussed nor met by the Teramachi disclosure.

Japanese Patent 5-285757 discloses a table clamp mechanism for a rotary table for clamping the table in a still condition by projecting a piece in the outer direction of the table and providing a top sliding member and upper surface for locking the table in place. A recess is provided on the inner peripheral surface of a frame main body and an elastic plate member is provided on the lower surface of the recess. A sliding member is provided on the elastic plate member. The elastic plate member and the frame main body are fixed with a bolt, and the elastic plate member and the sliding member are fixed with a bolt to the fixing part between the elastic plate member and the frame member body placed at a specific distance. A projection piece is projected in the outer direction to the table and the projection piece is held and fixed by the top of the sliding member and the upper surface of the recess so as to clamp the table.

Japanese Patent 47-23514 discloses a clamping device for slidable structures of a machine tool such as a rotary table, sliding base, a table and other fixed machines in which a clamping force is engaged with an elongate clamping member at right angles to a sliding plane. The clamping member is slidably coupled to the structure at a vertical edge and is resilient in the direction of the clamping force. The clamping member is provided with two parallel band units which are coupled by a web. One band unit is coupled to the slidable structure and the other band unit has a T groove. In operation, once slid into position, a table can be locked by pulling down on one band unit with a bolt and affixing that band unit against a reference surface. In this way a slidable structure attached to the parallel band unit may be moved to a selected position and locked into place.

U.S. Pat. No. 3,786,721 to Kazimierz discloses a clamp for rotary tables. A clamping apparatus for clamping a rotary table assembly, particularly when it is incorporated into a numerically controlled machine tool system where maintaining a static position without influencing table orientation is specifically desired is disclosed. The clamping apparatus includes clamping jaws which engage an annular clamping ring disposed on the rotary table. The clamping jaws apply essentially equal and opposite clamping forces to each side of the clamping ring to clamp the table without influencing the loading in any direction. The gripping action of the clamping jaws is actuated by a levered linkage to attain a mechanical advantage which reduces the size and expense of the apparatus and simplifies its incorporation into rotary table assemblies. The clamping apparatus is designed as an over-center device so that when it is in its clamped position, a positive force is required unclamp it. This provides fail safe operation inasmuch as failure of the clamp actuating device does not release the holding forces.

Many clamping devices have been used to clamp rotary tables. In the devices thus far developed, clamping has ignored axial misalignment of the table or has focused on avoiding deflection of clamping portion of the table being held. Further, to maintain tolerances demanded within the art, expensive high precision bearings and races have been employed requiring that they be installed within clean room conditions. Although clamping devices in the prior art have been used in various machine tool devices, as above disclosed by way of example, the demands on rigidly holding the table surface upon which the substrate is be placed for cutting have not fully been addressed as will be evident from the details disclosed herein and the objects presented for the present invention.

SUMMARY OF INVENTION

It is a primary object of the present invention to hold a work surface parallel to a reference surface within critical dimensions demanded of electronic substrate dicing operations. It is thus an object of the present invention to prevent movement of a rotary table employed by the dicing machine. It is further an object of the invention hold the table top surface in a parallel position relative a reference surface. It is yet another object of the invention hold this parallel position independent of axial errors within the rotation axis of the table. It is further an object of the invention maintain the table work surface in a static position by deforming a peripheral portion of the for conforming with the reference surface. It is yet another object of the invention to deflect the peripheral portion for eliminating table misalignment resulting from table axial misalignment. It is yet another object of the invention to provide such table clamping without the need for expensive components typical of the art and without the need for assembly of apparatus elements in clean room conditions.

A rotary table locking apparatus comprises a table assembly having a work surface with a deflectable peripheral portion. The peripheral portion has a bottom surface for making frictional contact with a base reference surface and an opposing top surface for communicating with a plunger element surface. A base having a reference surface for positioning the table assembly thereon has a peripheral portion adjacent the table assembly peripheral portion. The base peripheral portion has a cavity formed by a cavity top wall and cavity side walls. The side walls are dimensioned for receiving a plunger element defined by top, bottom and side surfaces. The plunger element bottom surface is dimensioned for making frictional contact with the table peripheral portion top surface. The plunger element side surfaces are positioned for slidable movement along the cavity side walls. The plunger element further has a top wall which in combination with the cavity top and side walls defines a chamber. A flexible member in sealable contact with the plunger side surfaces and cavity side walls is sufficiently flexible for elastically deforming from a first sealable position during a first pressure level within the chamber a second sealable position during increased pressure within the chamber for placing the plunger element bottom surface in frictional contact with the table peripheral portion top surface and thus lock the table in a rigid position. The plunger element retracts from frictional contact with return the first pressure level within the chamber.

The apparatus further comprises the base having a bore for receiving a shaft. The bore has a race within a bore side wall portion for receiving bearings. A shaft extends from the table assembly for rotating the table assembly about a longitudinal axis of the shaft. The shaft further has a race for communicating with the bore race through a bearing operating within the races for rotation of the shaft within the bore. A bearing is slidable within the races for providing smooth rotation of the shaft about the axis within the bore. The bearing is slidable within race center portions for shaft rotation of the table during the flexible member first sealable position. The bearing is movable a position biasing against opposing shaft and bore race sides for providing further table rigidity during the flexible member second sealable position thus further securing the table in a rigid position.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

Figure 1:
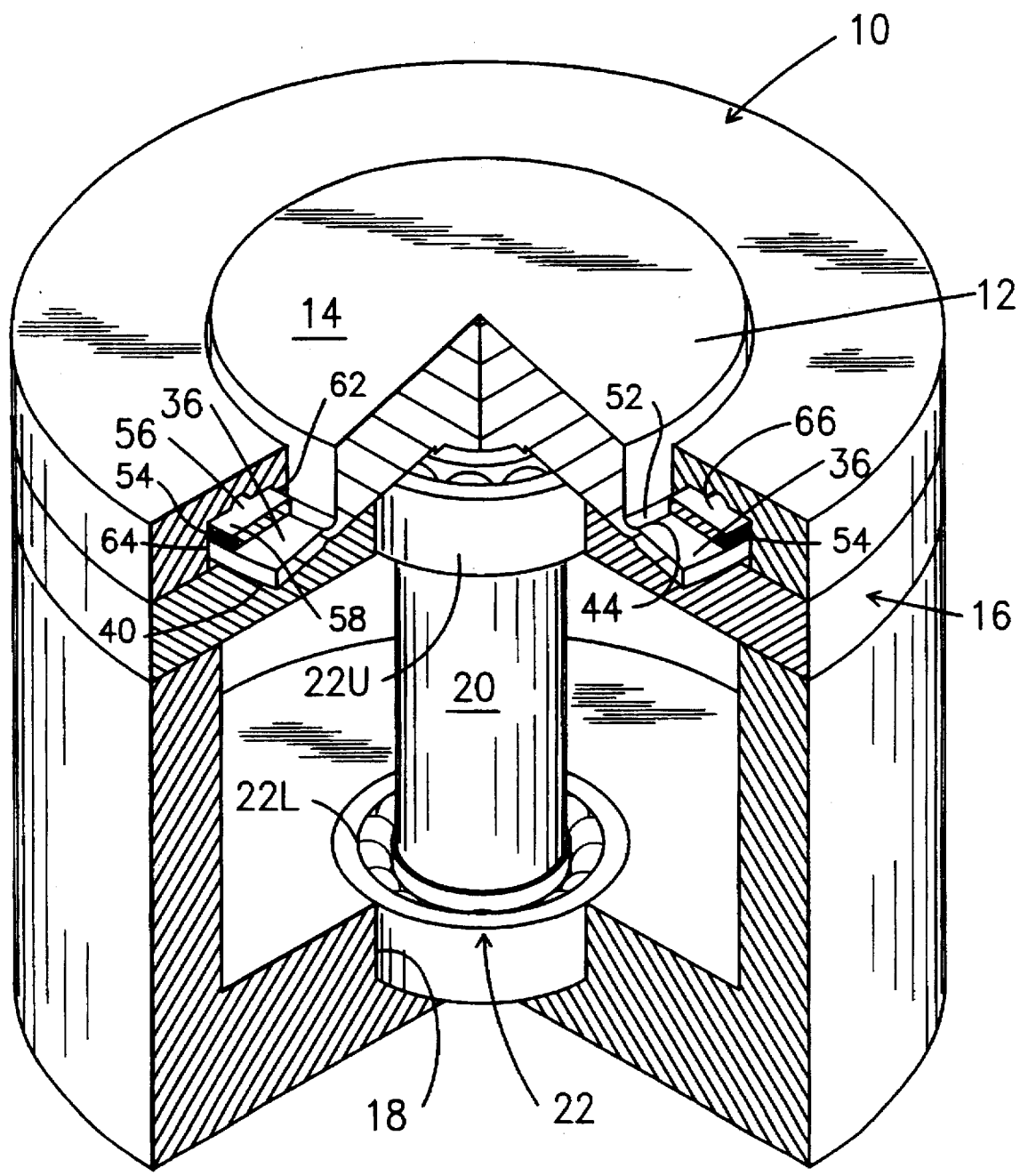
FIG. 1 is a top front perspective cut-away view of a rotary table illustrating a locking apparatus of the present invention.

The preferred embodiment of the rotary table locking apparatus is illustrated with reference to the attached drawings in which FIG. 1 illustrates a cut-away view of the apparatus 10 comprising a cylindrically shaped rotary table 12 having a work surface 14 upon which a workpiece, typically an electronic substrate is removably attached for dicing by a diamond dicing blade (not shown). The rotary table 12 is a well known part of a dicing saw (not shown) to which the present invention focuses for satisfying the earlier described need for rigidity during the dicing process. However, it is expected that the apparatus 10 will be well suited to other machining operations.

With reference to FIG. 2 and again to FIG. 1, a base 16 has a bore 18 dimensioned for receiving a shaft 20 rotating within a ball bearing assembly 22 which will later be described in greater detail. The shaft 20 extends from a table bottom surface 24 for rotation about an axis of rotation 26. As will also be later described, the shaft 20 is displaced longitudinally along the axis 26 during the locking operation. The base 16 further includes a reference surface 28 to which the work surface 14 is made parallel when in the table locked position.

Various methods can be employed to rotate the table 12. In the preferred embodiment of the present invention, a worm gear assembly 30 including a shaft driven gear 32 communicating with a motor controlled drive gear 34 is used as illustrated with further reference to FIG. 2.

Figure 2:
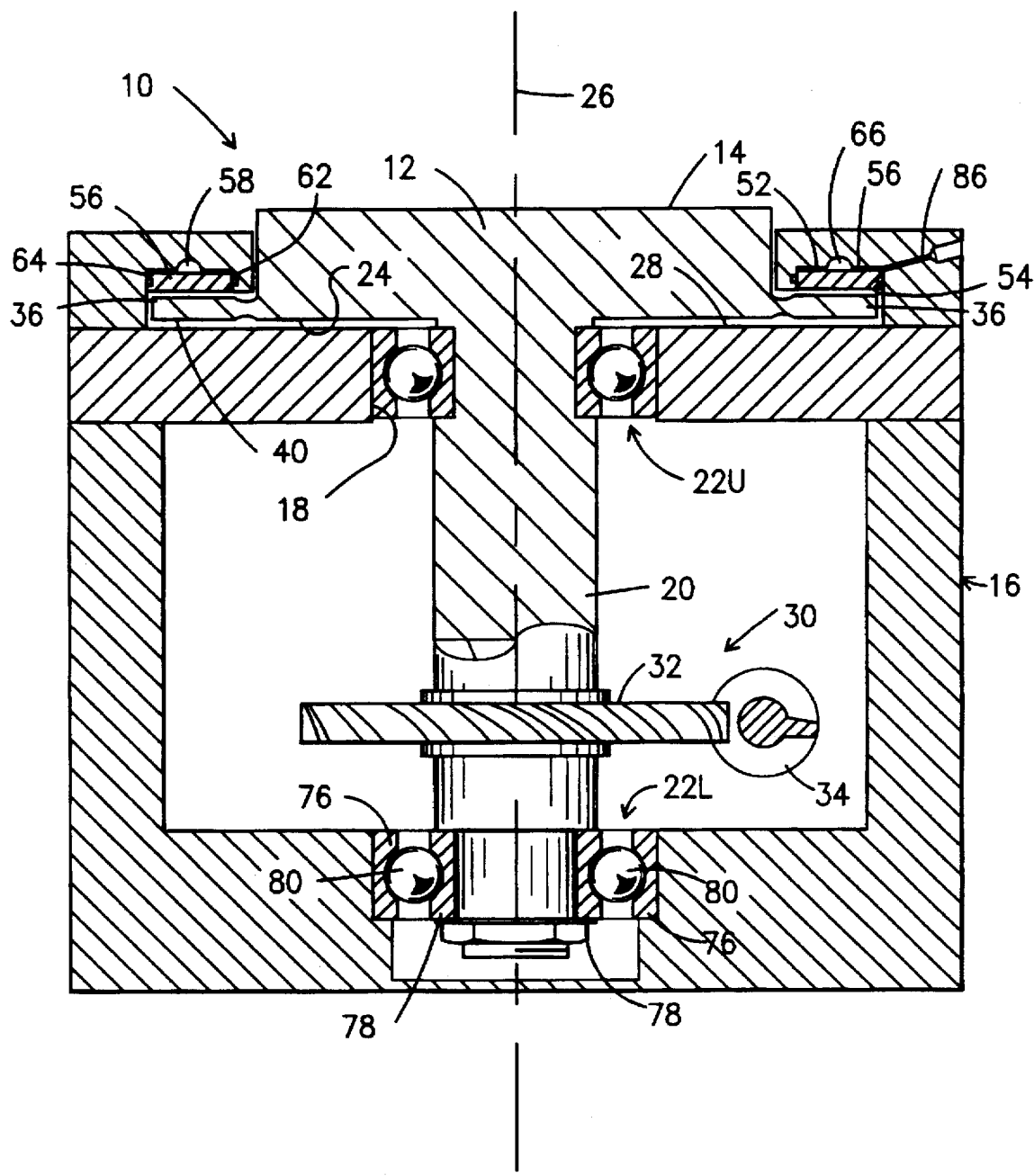
FIG. 2 is a cross-sectional view of the apparatus of FIG. 1 through a central axis of the apparatus.

With reference to FIG. 3, and again to FIGS. 1 and 2, a disk rotor 36 extends radially outward from the axis 26 from a table bottom portion 38. The disk rotor 36 has a flat bottom surface 40 proximate the reference surface 28 and an opposing flat top surface 42. The work surface 14, reference surface 28 and rotor bottom surface 40 are in parallel planes. The rotor 36 is flexibly attached to the table bottom portion 38 by a web 44 connected along the periphery of the table bottom portion 38. The rotor 36 is thus permitted to flex in a direction generally parallel to the axis 26 but prevented from rotating about the table bottom portion 38. The table 12, web 44 and rotor 36 are integrally formed in the preferred embodiment.

Figure 3:
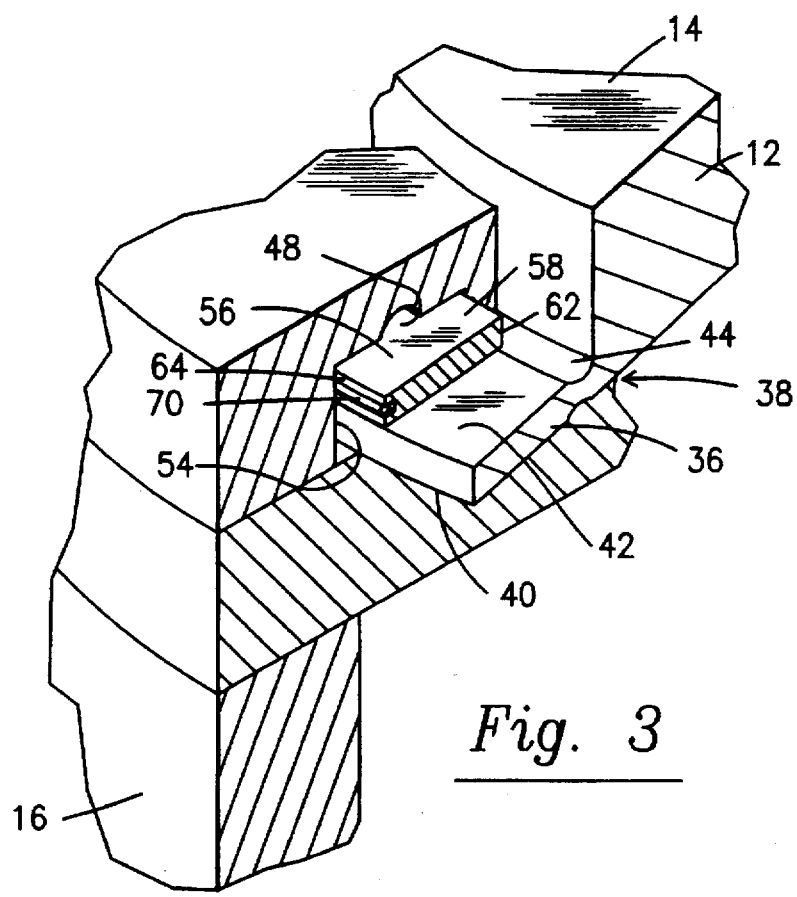
FIG. 3 is a partial exploded perspective view through the cut-away section III—III of FIG. 1.
Figure 4:
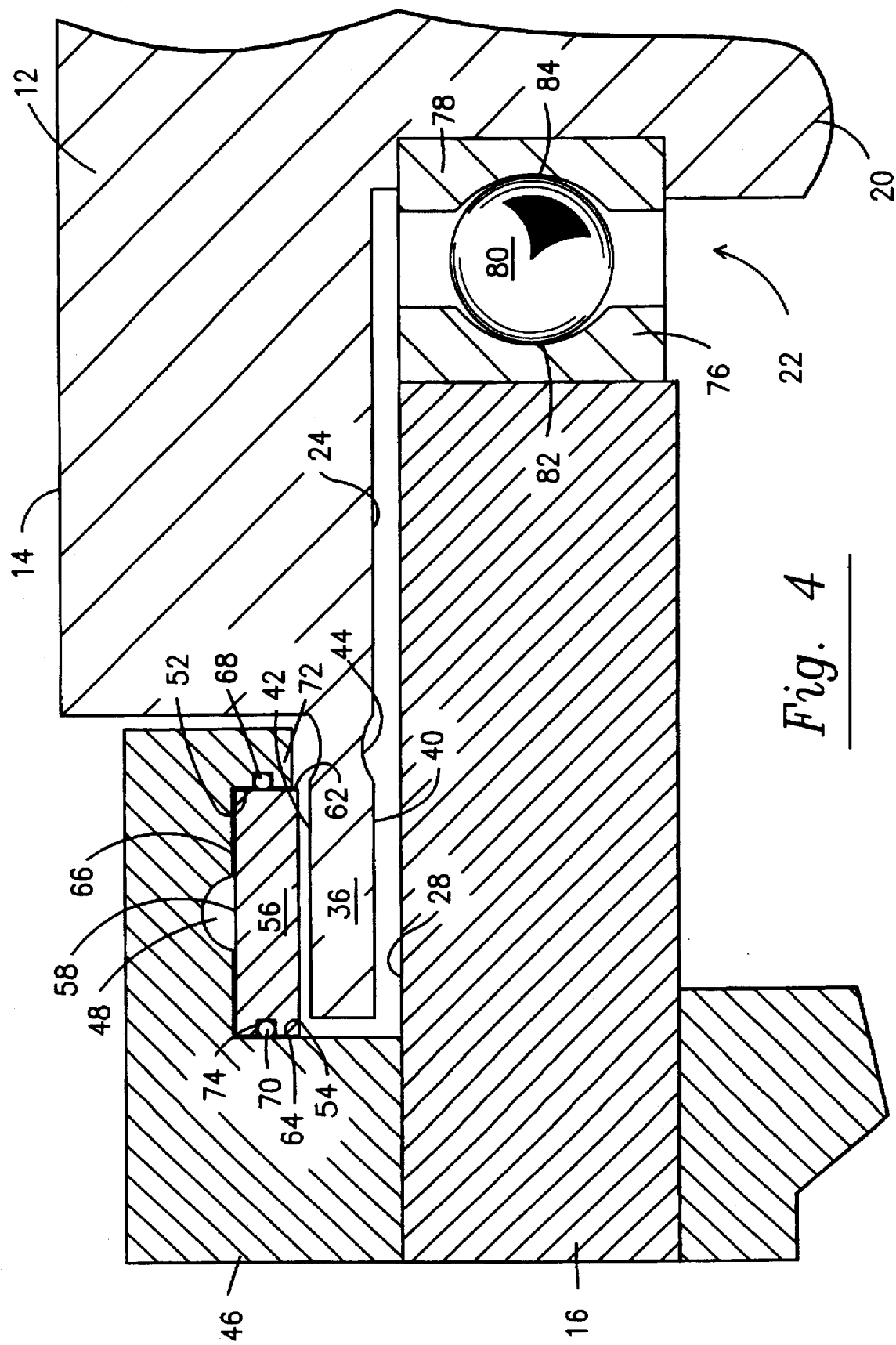
FIG. 4 is a partial exploded elevational view through section IV—IV of FIG. 2 illustrating an unlocked position.
Figure 5:
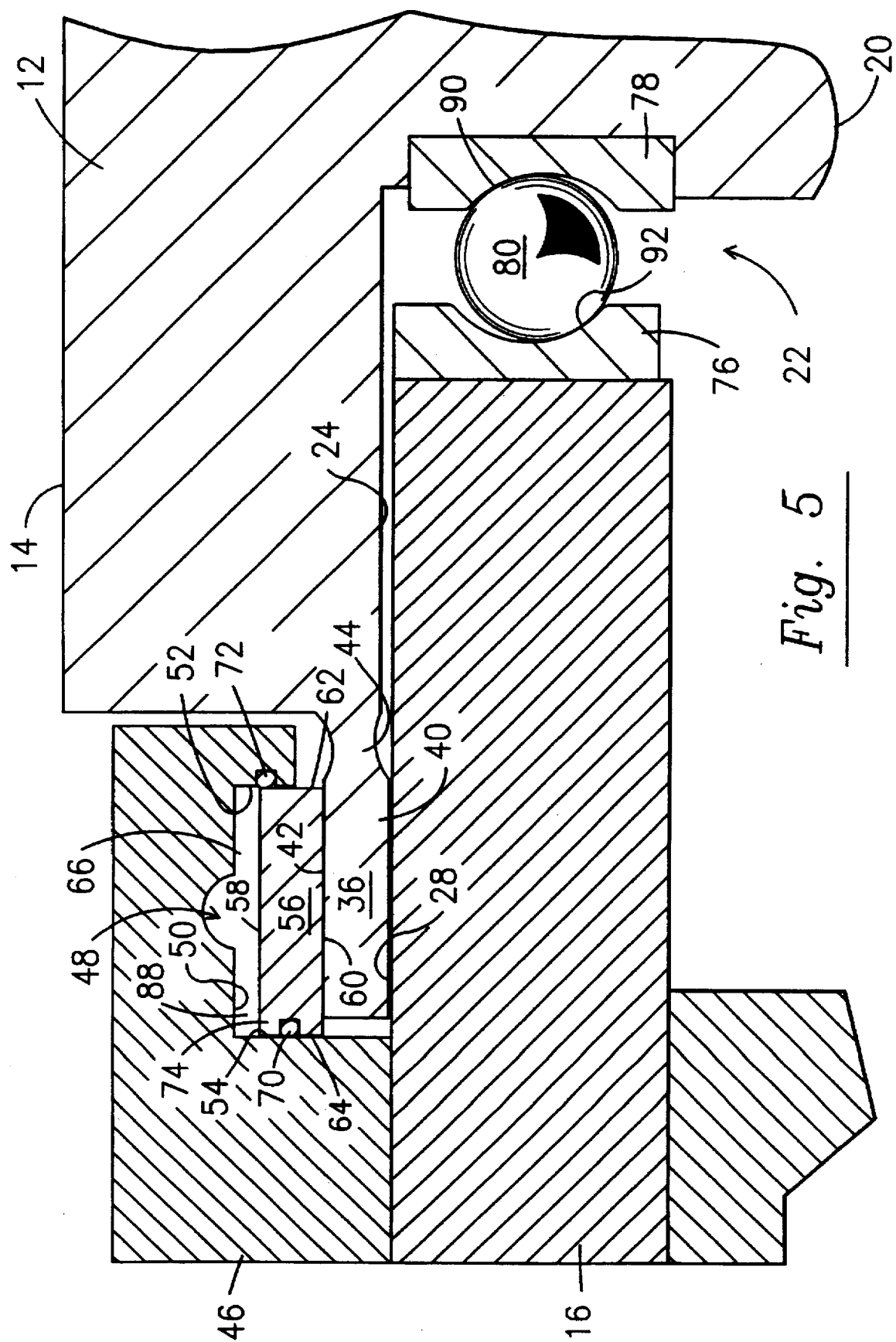
FIG. 5 is a partial exploded elevational view through section IV—IV of FIG. 2 illustrating a locked table position.

As illustrated with reference to FIGS. 1 through 3, and in exploded views of FIGS. 4 and 5, a base peripheral portion 46 contains a cavity 48 which extends over the rotor 36, both extending completely around the table 12. The cavity 48 is defined by a top wall 50, and adjacent arcuate inner and outer walls 52 and 54. The inner wall 52 being convex and closer to the axis 26 than the concave outer wall 54. A plunger 56 defined by top surface 58, bottom surface 60, and arcuate inner and outer side walls 62 and 64 is closely received between the cavity walls 52 and 54, as illustrated again with reference to FIG. 4. The plunger top surface 58 forms a chamber 66 in combination with the cavity walls 50, 52, and 54, as illustrated again with reference to FIGS. 4 and 5. By pressurizing the chamber 66, the plunger 56 is forces outward toward the rotor 36 as will be further described for apparatus operation. As illustrated in FIG. 4, O-rings 68 and 70 are fitted within O-ring grooves 72 and 74 cut in the cavity inner wall 52 and plunger outer wall 64, respectively.

Again with reference to FIGS. 1 and 2, the preferred embodiment of the present invention comprises upper and lower bearing assemblies 22U and 22L. Each operates in a similar manner and comprises, as again with reference to FIG. 4, a bore race 76 cooperating with a shaft race 78 for permitting ball bearings 80 to rotate therebetween. During rotation of the shaft 20, the bearings 80 generally track within central portions 82 and 84 of the bore race 76 and shaft race 78 again as illustrated with reference to FIG. 4.

In operation, air under pressure is forced into the chamber 66 through a conduit 86 providing access into the chamber 66 as illustrated by way of example again with reference to FIG. 2. Alternate air injection conduit means well known in the art are acceptable. The pressurized chamber 88, as illustrated with reference to FIG. 5, causes the plunger 56 to be displaced away from the cavity top wall 50. The plunger bottom surface 60 biases against the rotor top surface 42 with sufficient pressure to displace the rotor 36 to bias the rotor bottom surface 40 against the reference surface 28. Sufficient pressure is placed within the chamber 88 to hold the cooperating surfaces, 42 and 60, and 28 and 40 in frictional contact sufficient to prevent movement of the table 12. The rotor 36 is flexed about the web 44 and the table work surface 14 is thus rigidly held parallel to the reference surface 28 without concern for axial misalignment.

In the preferred embodiment of the present invention, the shaft 20 is displaced along the axis 26 sufficiently to cause the bearings 80 to be moved away from the race central portions 82 and 84 and bias against diagonally opposing race edge portions 90 and 92 as further illustrated with reference to FIG. 5. Such bearing 80 positioning within the races 76 and 78 provides further rigidity in holding the shaft 20 and thus the table 12 in a rigidly held position.

Figure 6:
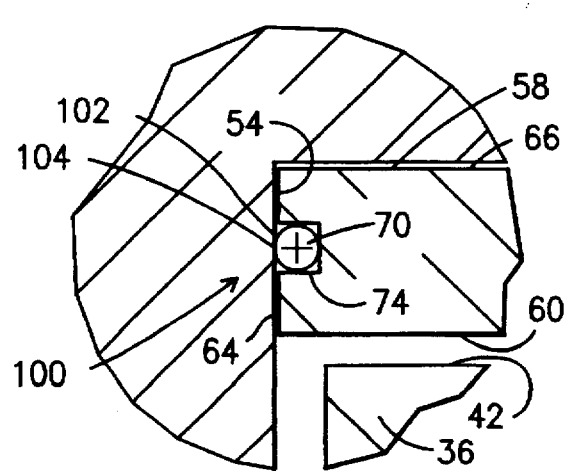
FIG. 6 is an exploded cross-sectional view through section VI—VI of FIG. 4 illustrating an O-ring during the unlocked table position.
Figure 7:
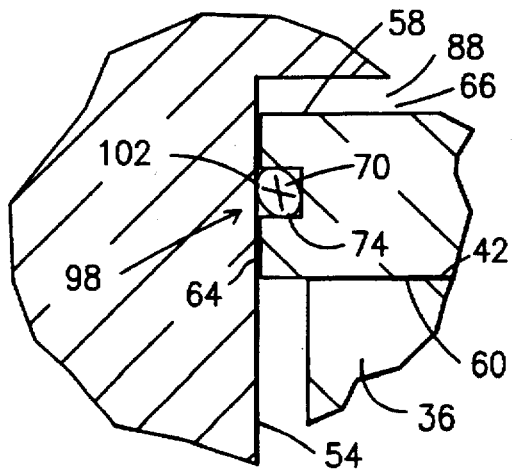
FIG. 7 is an exploded cross-sectional view through section VII—VII of FIG. 5 illustrating an O-ring during the locked table position.

To return from a locked position 94 as illustrated with reference to FIG. 5 to an unlocked position 96 illustrated and described with reference to FIG. 4, pressure in the chamber 66 is reduced to an ambient pressure level. In so doing, the O-rings 68 and 70 go from an elastically twisted position 98 to an ambient position 100 as illustrated with reference to FIGS. 6 and 7. By way of example, and with reference to FIGS. 6 and 7, the plunger wall O-ring 70 operation is described. In the O-ring ambient position 100, an O-ring edge portion 102 in frictional and sealable contact with a cavity 104. When sufficient pressure is applied to the chamber 88 to displace the plunger 56 as earlier described, the pressure is also sufficient to stretch or twist the O-ring 70. The displacement of the plunger 56 is sufficient to bias against and displace the rotor 36 as earlier described but the measure of displacement is not sufficient to dislodge the O-ring edge portion 102 from its frictional sealable contact with the cavity wall portion 104. Thus, with reduction of chamber pressure to an ambient level, the bias within the twisted O-ring 70 pulls the plunger 56 away from its contact with the rotor 36.

Figure 8:
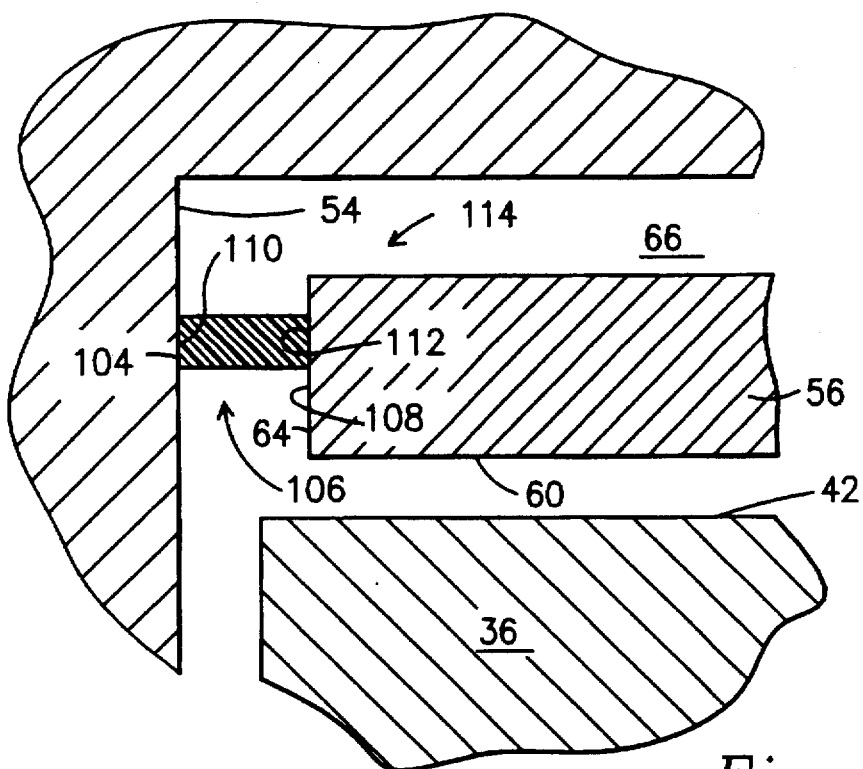
FIG. 8 is a partial exploded cross-sectional view functionally illustrating a flexible member in sealable contact with cooperating side walls with a pressure chamber at an ambient pressure level.
Figure 9:
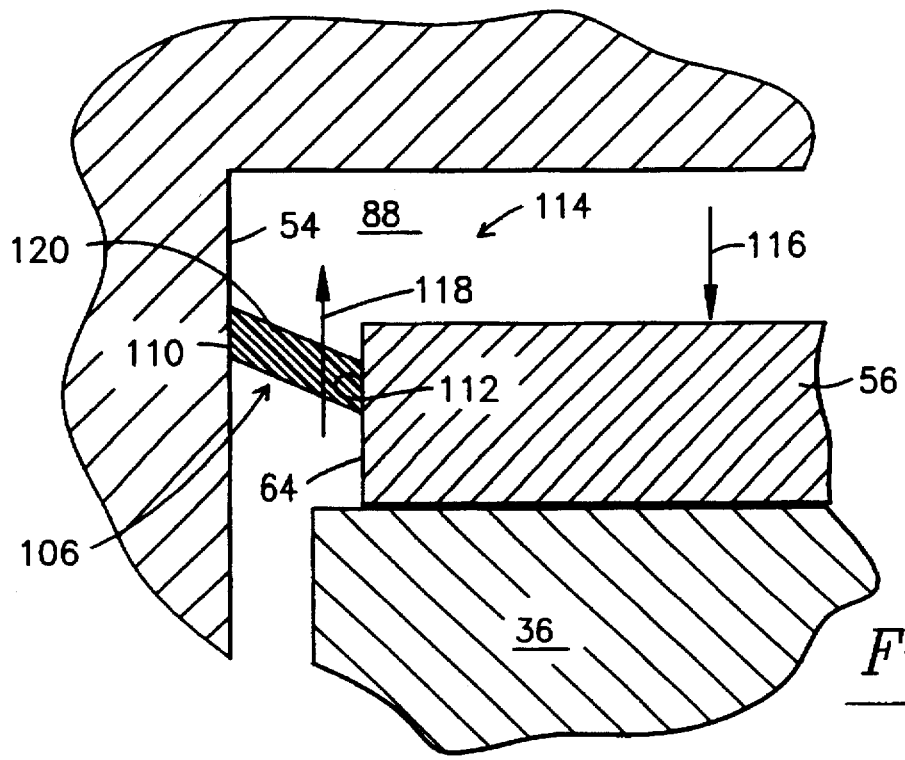
FIG. 9 is a exploded cross-sectional view functionally illustrating a flexible member in sealable contact with cooperating side walls with a pressure chamber at an increased pressure level.

The preferred embodiment of the present invention is as earlier described using O-rings 68, 70 and grooves 72, 74 in the plunger wall 64 and cavity wall 52. However, the retracting of the plunger 56 from its displaced location during the locking position 94 to its location during the unlocked position 96 is further described with reference to FIGS. 8 and 9 using an alternate arrangement. By way of example, a flexible member 106 is placed within frictional contact with the cavity outside wall portion 104 and a plunger outside wall portion 108 at flexible member side portions 110 and 112 respectively. The arrangement under ambient pressure conditions within the chamber 66 is as illustrated with reference to FIG. 8. With increased pressure within the chamber 88 as illustrated with reference to FIG. 9, the plunger 56 is displaced with sufficient pressure within the chamber 88 to overcome bias within the flexible member 106 to hold it in its ambient position 114. As illustrated with directional arrows in FIG. 9, a force 116 due ti increased pressure within the chamber 88 displacing the plunger 56 is sufficient to overcome the force 118 within the stretched flexible member 120. With release of the displacing force 116, sufficient force 118 in the stretched flexible member 120 (and in the O-rings as earlier described) exists to pull the plunger 56 back to its ambient position 114 as long as the frictional contact between the cavity outside wall portion 104 and flexible member side portion 108 and the contact between the flexible member side portion 110 and plunger outer side portion 108 remain in frictional immovable contact. In the O-rings earlier described, twisting takes place within the O-ring, but the function of creating the stretching force 118 is the same. Such force 118 eliminates the need to create a vacuum within the chamber in order to retract the plunger 56 and as a result the need for additional vacuum systems and devices is eliminated.

While a specific embodiment of the invention has been described in detail herein above, it is to be understood that various modifications may be made from the specific details described herein without departing from the spirit and scope of the invention as set forth in the appended claims. Having now described the invention, the construction, the operation and use of a preferred embodiment thereof, and the advantageous new and useful results obtained thereby, the new and useful constructions, methods of use and reasonable mechanical equivalents thereof obvious to those skilled in the art, are set forth in the appended claims.

What is claimed is:

1. A rotary table locking apparatus comprising:

a table assembly having a work surface within a table central portion and the assembly further having a peripheral portion hingeably attached to the central portion, the peripheral portion adapted for making frictional contact with a base;

a base having a reference surface for rigidly securing the table peripheral portion; and clamping means for securing the table assembly peripheral portion to the base reference surface, the clamping means rigidly securing the table to the base when in a clamped position and permitting movement of the table during an unclamped position.

2. The apparatus as recited in claim 1, further comprising:

the base having a bore for receiving a shaft, the bore having a race carried within a bore side wall portion for receiving bearings;

a shaft extending from the table assembly for rotating the table assembly about a longitudinal axis of the shaft, the shaft rotatable within the bore, the shaft having a race for receiving the bearings operating within the races; and a bearing slidable within the races for providing smooth rotation of the shaft about the axis within the bore, the bearing generally slidable within race center portions for shaft rotation during the clamping means clamped position, the bearing movable to a position biasing against opposing shaft and bore race side portions for providing a frictional force between the shaft and the base and thus further table rigidity.

3. A rotary table locking apparatus comprising:

a table assembly having a rotatable central portion having a work surface, the assembly further having a peripheral portion for communicating with clamping means, the peripheral portion hingeably attached to the central portion;

a base having a reference surface adapted for securing the peripheral portion there to, the base further having a bore for receiving a shaft, the bore having a race within a side wall portion for receiving bearings;

clamping means for removably securing the table assembly peripheral portion to the base reference surface for locking the table assembly in a rigid position during a clamped position thus preventing rotation of the table assembly, the clamping means permitting table assembly rotation during an unclamped position;

a shaft extending from the table assembly and received within the bore for rotating the assembly about a longitudinal axis of the shaft, the shaft having a race positioned for communicating with the bore side wall race through a bearing operating within the races; and a bearing slidable within the races for providing smooth rotation of the shaft about the axis within the bore, the bearing generally slidable within race center portions for shaft rotation during the unclamped position, the bearing movable to a position biasing diagonally against opposing shaft and bore race sides for providing further table rigidity during the clamped position.

4. The apparatus as recited in claim 3, wherein the clamping means comprises:

the base further having a peripheral portion adjacent the table assembly peripheral portion, the base peripheral portion having a cavity formed by a cavity top wall and cavity side walls, the side walls dimensioned for receiving a plunger element;

a plunger element defined by top, bottom and side surfaces, the plunger element attached to the table assembly peripheral portion along one plunger element side surface, the attaching sufficient for deflecting the plunger element in a direction generally parallel to the shaft axis during the clamped position for holding the plunger element against the base reference surface and rigidly holding the table assembly, the plunger element bottom surface dimensioned for making frictional contact with the table peripheral portion, the plunger element side surfaces positioned for slidable movement along the cavity side walls, the plunger element further having a top wall defining a chamber in combination with the cavity walls; and a flexible member in sealable contact with the plunger side surfaces and cavity side walls, the flexible member sufficiently flexible for elastically deforming from a first sealable position during a first pressure level within the chamber to a second sealable position during increased pressure within the chamber for placing the plunger element bottom surface in frictional contact with the table peripheral portion top surface thus locking the table in a rigid position, the plunger element retracting from frictional contact with return to the first pressure level within the chamber.

5. A rotary table locking apparatus comprising:

a circular table having a center portion and peripheral portion surrounding the center portion, the table having a top surface for placing a workpiece thereon and an opposing bottom surface having a shaft extending therefrom for rotation of the table about a longitudinal axis of the shaft, the shaft having a cylindrical side wall;

a disk rotor flexibly extended from the table peripheral portion, the rotor hingedly flexible about the table peripheral portion for movement from a position out of contact with a base contact surface for rotation of the table to a position in contact with the base reference surface for locking the rotor against the base reference surface, the rotor having a first surface for making frictional contact with the base reference surface and a second surface for making frictional contact with a plunger surface;

a base having a reference surface for biasing the rotor first surface thereto, the base having a bore for closely receiving the shaft for movement of the shaft within the bore, the bore having a cylindrical side wall for receiving the shaft cylindrical wall, the base having a peripheral portion proximate the table peripheral portion, the base peripheral portion formed for receiving the rotor therein, the base peripheral portion having a cavity opposing the rotor second surface, the cavity having a top wall and side walls, the side walls dimensioned for receiving a plunger therebetween;

a plunger defined by opposing first and second surfaces and opposing side surfaces, the plunger second surface dimensioned for making frictional contact with the disk rotor second surface, the plunger side surfaces positioned for slidable movement along the cavity side walls, the plunger first surface in combination with the cavity top and side walls defining a chamber; and a flexible member in sealable contact with a plunger side surface and cavity side wall, the flexible member sufficiently flexible for elastically deforming from a first sealable position during a first pressure level within the chamber to a second sealable position during increased pressure within the chamber for biasing the plunger second surface against the rotor second surface for placing the plunger second surface in frictional contact with the rotor second surface and the rotor first surface into frictional contact with the reference surface for locking the rotor and thus the table in a rigid position, the plunger retracting from frictional contact with a return to the first pressure level within the chamber.

6. The apparatus as recited in claim 5, further comprising:

ball bearings dimensioned for freely rotating within a race;

a first arcuate groove within the bore side wall, the first groove within a plane perpendicular to the shaft axis, the first groove having opposing edge portions and a central portion for movement of the ball bearings about the central portion; and a second arcuate groove within the shaft wall, the second groove opposing the first groove, the second groove having opposing edge portions and a central portion for movement of the ball bearings within the central portion, the first and second arcuate grooves cooperating to form a race for freely receiving the ball bearings for movement within the race, the groove central portions further cooperating to permit free movement of the bearing within central portions during rotation of the shaft within the bore during the first chamber pressure level while the plunger is out of contact with the rotor thus permitting rotation of the table, the groove edge portions cooperating to bias the ball bearings against opposing bore and shaft race edge portions during the chamber increased pressure for providing rigidity between the shaft and bore and thus further rigidity to the table during the flexible member second sealable position.

7. The apparatus as recited in claim 5, further comprising a shaft gear attached to the shaft for rotating the shaft in response to a driven gear communicating with the shaft gear.

8. The apparatus as recited in claim 5, wherein the plunger further comprises a groove within a side wall most distant the axis and the cavity side wall closest the axis having a groove, the plunger and cavity wall grooves dimensioned for receiving the flexible member.

9. The apparatus as recited in claim 5, further comprising a port extending through the base peripheral portion for providing access to the chamber for controlling pressure within the chamber.

10. A rotary table useful with a computer controlled dicing saw, the rotary table comprising:

a table base having a vertical cylindrical bore for receiving a shaft for rotation within a bore side wall, the bore side wall having a first race positioned for communicating with a shaft first wall race through ball bearings operating within the first races, the bore further having a second race positioned for communicating with a shaft second race through ball bearings operating within the second races, the base further having a reference surface within a plan perpendicular to a longitudinal bore axis;

a cylindrical shaft having an axis or rotation coincident with the bore axis for shaft rotation within the bore, the shaft outside wall dimensioned for free rotation along the bore side wall, the shaft extensively within the bore, the shaft having one end extending outward from the bore for attaching to a table; the shaft wall having a first race positioned proximate a shaft table end for communicating with the bore first side wall race through ball bearings operating within the first races and a second race positioned at an opposing shaft end for communicating with the bore second race through ball bearings operating within the second races;

ball bearings slidable within the races for providing smooth rotation of the shaft about the axis within the bore, the bearings generally slidable within race center portions for shaft rotation during a table unclamped position, the bearings movable to a position biasing against opposing shaft and bore race sides for providing further table rigidity during a table clamped position;

a cylindrical table attached at a table bottom side to the shaft extended end for rotation of the table about the axis of the shaft, the table having an opposing table work surface for placing a workpiece upon the surface, the work surface generally parallel to the reference surface during free rotation of the shaft within the bore;

a circular disk rotor attached along a peripheral portion of the table within a plane parallel to the work surface, the disk hingably attached for movement from a first position distant the base reference surface for free rotation of the shaft and thus table about the axis to a second position wherein the rotor is biased against the reference surface for locking the rotor and pulling the table into a rigid position having the work surface parallel to the reference surface; and means for biasing the rotor against the reference surface, the biasing sufficient for providing frictional contact between the rotor and reference surface for preventing rotation of the table and further for moving the bearings to the position biased against opposing shaft and bore race sides, thus providing table rigidity for operation on the workpiece attached to the work surface.

11. The table as recited in claim 10, wherein the biasing means comprises:

a ring member attached to the base reference surface, the ring member and reference surface forming an opening for receiving the rotor therein, the ring member further having a cavity extending over the rotor for placing the rotor between the cavity and the reference surface, the cavity defined by a top wall and opposing parallel side walls; and a plunger slidable within cavity side walls, the plunger having a top surface defining a chamber in combination with the cavity walls, the plunger further having a bottom surface for biasing against the rotor in response to increased pressure within the chamber.

12. The table as recited in claim 11, further comprising:

the ring member cavity side wall proximate the axis having a groove for receiving a ring member O-ring;

the plunger having a side wall distant the axis, the distant side wall having a groove for receiving a rotor O-ring;

a ring member O-ring positioned within the ring member groove; and a plunger O-ring positioned within the plunger wall groove, the O-rings positioned for making sealable contact with corresponding rotor and surface portions, the O-rings flexing from a first position wherein sealable contact is made at a wall surface portion for each O-ring to a second O-ring twisted position wherein the O-rings maintain sealable contact at their respective surface portions, the O-rings elastically torqued by movement of the plunger resulting from increased pressure within the chamber, the O-rings further returning to their first sealable position with removal of the increased pressure within the chamber.

13. A rotary table locking apparatus comprising:

a table assembly having a rotatable work surface, the assembly further having a peripheral portion hingeably attached thereto;

a base having a surface portion for clamping the table assembly thereto, the base further having a bore for receiving a shaft;

clamping means carried by the base, the clamping means for placing the table assembly peripheral portion in frictional contact with the base for locking the table assembly in a rigid position;

a shaft extending from the table assembly for rotating the table assembly about a longitudinal axis of the shaft, the shaft closely received within the bore for rotation about the axis; and bearing means carried within the bore for providing rotation of the shaft, and thus the table, about the axis, the bearing means comprising a first race carried by the shaft and a second race carried by the base, the bearing means further comprising a bearing slidable between the first and second races, the bearing generally slidable within race center portions during shaft rotation about the axis for rotating the table assembly, the bearing biasing against first and second race diagonally opposing race portions during longitudinal displacement of the shaft along the axis, the biasing providing sufficient force for rigidly securing the table to the base.

14. The apparatus as recited in claim 13, wherein the bearing comprises a ball bearing, the biasing thus providing a force between each race opposing portion with such force between the base and the shaft extending through the ball bearing center.

15. A rotary table locking apparatus comprising:

a table assembly having a central portion for providing a work surface, the assembly further having a peripheral portion hingeably attached to the central portion;

a base having a surface portion for positioning the table assembly thereto; and clamping means for clamping the table assembly peripheral portion to the base surface portions, the clamping means locking the table assembly in a rigid position during a clamped position for preventing rotation of the table assembly.

16. The apparatus as recited in claim 15, further comprising:

a shaft extending from the table assembly for rotation of the table assembly about the axis, the base further having a bore for receiving the shaft therein; and bearing means carried within the bore for providing rotation of the shaft, and thus the table assembly, about the axis, the bearing means comprising a first race carried by the shaft and a second race carried by the base, the bearing means further comprising a bearing slidable between the first and second races, the bearing generally slidable within race center portions during shaft rotation about the axis for rotating the table assembly, the bearing biasing against first and second race diagonally opposing race portions during longitudinal displacement of the shaft along the axis, the biasing providing sufficient force for rigidly securing the table to the base.

17. A rotary table locking apparatus comprising:

a table having a disk rotor hingeably attached along a table peripheral portion;

a shaft extending from the table for rotating the table about a longitudinal axis of the shaft;

a base having a bore for receiving the shaft therein;

clamping means cooperating with the base for securing the table to the base to thereby longitudinally displace the shaft along its axis; and wherein the clamping means cooperates with the disk rotor for deflecting the disk rotor and placing the rotor in frictional contact with the base for the locking of the table to the base;

bearing means carried within the bore for providing the rotation of the shaft about the axis, the bearing means comprising a first race carried by the shaft and a second race carried by the base, the bearing means further comprising a bearing slidable between the first and second races, the bearing generally slidable within race center portions during shaft rotation about the axis for rotating the table assembly, the bearing operatively biasing against first and second race diagonally opposing race portions during the longitudinal displacement of the shaft along the axis, so that the biasing thereof cooperates with the clamping means for locking the table to the base.

* * * * *